(12) United States Patent
Hendrix

(10) Patent No.: US 8,768,733 B2
(45) Date of Patent: *Jul. 1, 2014

(54) SYSTEM AND METHOD USING INSURANCE FOR RISK TRANSFERENCE

(75) Inventor: Derrell Hendrix, Esher (GB)

(73) Assignee: Karson Management (Bermuda) Limited, Hamilton (BM)

( * ) Notice: Subject to any disclaimer, the term of this patent is extended or adjusted under 35 U.S.C. 154(b) by 50 days.

This patent is subject to a terminal disclaimer.

(21) Appl. No.: 13/442,390

(22) Filed: Apr. 9, 2012

(65) Prior Publication Data

US 2013/0096957 A1    Apr. 18, 2013

Related U.S. Application Data

(63) Continuation of application No. 12/437,852, filed on May 8, 2009, now Pat. No. 8,155,985.

(60) Provisional application No. 61/052,035, filed on May 9, 2008, provisional application No. 61/052,048, filed on May 9, 2008, provisional application No. 61/052,067, filed on May 9, 2008, provisional application No. 61/052,053, filed on May 9, 2008.

(51) Int. Cl.
*G06Q 40/00* (2012.01)
*G06Q 10/00* (2012.01)
*G06Q 50/00* (2012.01)
*G06Q 40/08* (2012.01)

(52) U.S. Cl.
CPC ...................... *G06Q 40/08* (2013.01)
USPC ........................ 705/4; 705/2; 705/3

(58) Field of Classification Search
USPC ........................................... 705/2, 3
See application file for complete search history.

(56) References Cited

U.S. PATENT DOCUMENTS 8,155,985 B2 * 4/2012 Hendrix ........................ 705/4

OTHER PUBLICATIONS

Betterley et al.,"Using financial insurance for predictible losses." Sep. 1991 p. 31.*

* cited by examiner

*Primary Examiner* — Neal Sereboff
(74) *Attorney, Agent, or Firm* — Mayer Brown LLP

(57) ABSTRACT

Disclosed herein is a system and method for eliminating or transferring the non-economic risk of financial securities. The system and method serves to avoid non-economic losses in the first instance, and to counter the adverse capital impact of prior non-economic gap losses by providing capital relief consistent with a determined protected amount. A second party provides to a first party a policy covering potential losses in value for a fixed income securities (FIS) Portfolio, particularly losses between an upper attachment value and a lower exit value. The second party provides capital to the first party as a policy security in the event that the aggregate principle payments (APP) of the FIS Portfolio are less than the attachment value and the first party makes a claim under the policy. The first party pledges policyholder security for its future obligation to return all or a portion of the policy security should no claims arise under the policy or if the policy security exceeds the amount sought by any claims. The policyholder security may be the FIS Portfolio or other agreed upon assets, or some combination thereof.

33 Claims, 12 Drawing Sheets

SYSTEM AND METHOD USING INSURANCE FOR RISK TRANSFERENCE

CROSS REFERENCE TO RELATED APPLICATIONS

This application is a continuation of U.S. patent application Ser. No. 12/437,852, filed May 8, 2009, now U.S. Pat. No. 8,155,985 which claims the benefit of U.S. Provisional Application No. 61/052,035, filed May 9, 2008; U.S. Provisional Application No. 61/052,048, filed May 9, 2008; U.S. Provisional Application No. 61/052,067, filed May 9, 2008; and U.S. Provisional Application No. 61/052,053, filed May 9, 2008. This application is related to the following non-provisional U.S. patent applications: U.S. patent application Ser. No. 12/437,831 for "SYSTEM AND METHOD USING SECURITIES ISSUANCE FOR RISK TRANSFERENCE," filed May 8, 2009; U.S. patent application Ser. No. 12/437,868 for "SYSTEM AND METHOD USING CONTRACT FOR RISK TRANSFERENCE," filed May 8, 2009; and U.S. patent application Ser. No. 12/437,886 for "SYSTEM AND METHOD USING ASSET SALE AND LOAN FOR RISK TRANSFERENCE," filed May 8, 2009, all of which are hereby incorporated by reference in their entirety as if fully set forth herein.

FIELD OF THE INVENTION

The present invention relates generally to systems and methods for transferring/acquiring a defined risk/discount associated with a security or portfolio of securities. More specifically, the invention relates to systems and methods for transferring non-economic risk through an insurance agreement.

BACKGROUND OF THE INVENTION

A significant number of banks, insurance companies, and other financial institutions maintain partial or full interests in structured finance and fixed income securities (FIS). These securities may include, for instance, those backed by mortgages, home equity loans, credit card receivables, auto loans, and collateralized loan obligations, as well as collateralized debt obligations (CDOs) and credit default swaps on fixed income securities and CDOs of fixed income securities (collectively, FIS Portfolios). To collect value from FIS a financial institution may treat FIS as an asset which it either intends to trade, or hold to maturity and collect principal and interest payments. Regardless of whether it seeks to keep, transfer, or acquire FIS, it is important that the financial institution be able to determine the value of FIS, if not for purposes of market pricing, then for the fact that the value of held FIS will affect a financial institution's balance sheet and possibly its income statement. In addition, the reported value of FIS may affect its credit rating or otherwise influence the amount of capital necessary to maintain a given FIS or FIS Portfolio. However, given characteristic market and regulatory conditions it may be difficult to appropriately value, finance, or trade FIS, regardless of the credit quality of its underlying assets or cash flows.

Changes by accounting standards boards, such as the Financial Accounting Standards Board (FASB), that govern the accounting profession will affect the perceived value of FIS by modifying the accounting standards used to determine the fair value of FIS. For example, under prior International Financial Reporting Standards, and with changes to U.S. General Accepted Accounting Principles, the value of FIS has been increasingly tied to fair value as determined by the transferability of the FIS. Under these prior accounting standards the fair value was determined by the price that would be received to sell the asset or to transfer a liability in an orderly transaction between market participants at the measurement date; however, this accounting treatment contrasted with the previous practice of many financial institutions, which involved estimating fair value using financial models that determine an expected value of FIS or FIS Portfolios. As seen in, for example, FASB Staff Position 157-4, the more recent accounting standard position has been to permit some flexibility in determining fair value in distressed market conditions or in situations where there has been a significant decrease in the volume and level of activity for the asset or liability being valued. Despite these changes, the prevailing standards continue to focus on determining the value of the asset or liability under current market conditions. As a result, the current market value of the FIS, as defined for accounting purposes, may be significantly lower than the expected value of the collection of principal and interest on the underlying securities.

In another instance, changes in market supply and demand for certain classes of securities can also affect the perceived value of given FIS. For example, difficulties surrounding the decline of securities backed by sub-prime mortgages have affected the values of FIS under fair value accounting standards. Factors such as a perceived lack of transparency, as well as the presence of securities issued by highly leveraged entities investing in FIS Portfolios (such as structured investment vehicles and conduits), have led investors to largely exit certain sectors of the FIS market. Despite attempts to increase transparency in accounting standards, the main sources of investor concern relate to an impaired ability to establish a current estimated market value for FIS, estimate future market value or maturity value for FIS, and estimate correlations between various FIS investments. As a result, investors are willing to pay less to acquire the securities affected by these concerns.

In addition to other factors, the changes to accounting standards and variations in investor demand represent forces that give rise to non-economic changes in the value of FIS. (e.g., changes that are not attributable to changes in market interest rates or default probabilities, but rather in market supply and demand characteristics). Because they are not generally based on changes in the level of interest rates (the interest rate curve) and the credit quality of the underlying securities (i.e., the expected amount of repayment of principal at maturity or upon default, as determined by qualitative analysis or by use of a model), these non-economic changes in value have significant accounting consequences and, if the securities are sold, real economic consequences for the holders of FIS and participants in FIS markets. In the current environment, the above factors have resulted in an increasing number of market participants having determined that the current market or liquidation value for FIS is often significantly below the expected or model-based value, resulting in the booking of substantial losses or reductions in capital resources. This, in turn, has prompted many financial institutions and other holders of interest in FIS to either sell assets (to avoid future risk of loss) or raise capital (in order to preserve or restore regulatory or rating agency capital ratios). Many financial institutions with access to the equity market have elected to raise fully-dilutive equity capital in order to shore up capital adequacy measures, rather than sell and realize non-economic losses on FIS Portfolios.

As a result, it would be advantageous to have a method for an arm's-length solution for eliminating or reducing non-economic risk that supports a higher-than liquidation value for FIS and FIS Portfolios, and satisfies financial institution auditors, rating agencies, regulators and analysts in terms of capital relief.

SUMMARY OF THE INVENTION

Disclosed herein are methods and systems, including computer program products, for eliminating or transferring the non-economic risk of financial securities. The systems and methods serve to avoid non-economic losses in the first instance, and to counter the adverse capital impact of prior non-economic gap losses by providing income and capital relief. In addition, the systems and methods described herein have the effect of transferring risk and countering the adverse profit-and-loss and capital impact of a non-economic component of marking to market in relation to illiquid securities or credit derivatives portfolios. More specifically, the systems and methods described herein provide for transferring risk up to an amount equal to the difference between (a) the current liquidation or fair market value of an individual security or a portfolio of securities and, (b) a value that is equal to the present value of expected future principal payments discounted at an appropriate discount rate (e.g., the swap rate for the corresponding maturity) of the security or the portfolio of securities (the "Gap" risk).

According to an embodiment of the system and method, a gap insurance program is implemented with respect to a selected asset, such as FIS or FIS Portfolios. At inception, two parties enter into an agreement whereby a second party provides to a first party a policy covering a value difference on the selected asset (up to a policy limit), and particularly to cover potential losses between an agreed upper asset value (or attachment value) and an agreed lower asset value (or the exit/exhaustion value). The changes in value of the selected asset are dependent on the total maturity or default recovery proceeds of the selected asset (i.e., the aggregate principal payments (APP) of the selected asset). The APP of the selected asset includes maturity values and recovery values, where the maturity values are the total principal payments at maturity of those portions of the selected asset reaching maturity, and where the recovery values are the total amounts recovered from any defaulted portions of the selected asset. The term of the policy is generally equal to the maturity profile of the selected asset. During the term of the policy, the first party may make a claim under the agreement in the event that the APP through to final maturity of the selected asset is less than the attachment value.

As security for its obligations under the policy, the second party provides collateral (e.g., cash) to the first party equal to the difference between the attachment value and the exit/exhaustion value. In return, the first party pledges its own security for its future obligation to return the collateral (or a portion thereof) should no claims arise under the conditions of the policy. The first party pledged security may include the selected asset, or other securities agreed upon by the parties, or any combination thereof. The first party pledged security may be held in trust either by the first party or by a third party custodian, and may be margined periodically.

In an embodiment of the program, the first party may be permitted to cancel the policy in whole or in part at any time, subject to a proportional reduction in the selected asset, or on such other basis as agreed upon between the parties, and by paying the second party a cancellation premium. The cancellation premium may be determined according to criteria that ensure that the second party receives a minimum return on its investment, as stated in the policy.

In another embodiment, the selected asset may be held for the duration of the policy under the control of a trustee. The trustee records cash received from principal repayments and/or recovery cash flows from the selected asset to be held until the termination of the policy. Although the termination date of the policy is generally determined to be co-terminus with the maturity profile of the selected asset, the parties to the program may agree to other expiration dates. As added security, the selected asset or portions thereof are not allowed to be sold or assigned without the prior written consent of the second party. At the termination date, the trustee is be charged with determining the APP of the selected asset and calculating the difference between the APP and the attachment value and the exit value.

In another embodiment, a processing system is relied upon to execute one or more of the steps of the above programs. The processing system includes a processor, one or more input devices (such as a keyboard or mouse) for inputting data into the system, and one or more displays for outputting information to the user. The processing system also includes a memory for storing data and instructions executable by the processor, and for storing an operating system. The memory may also include instructions for modeling the Gap risk in various securities and security portfolios, determining or estimating the aggregate principal payments of a security portfolio, and determining program variables and interest rates, in addition to various other steps as required by the programs herein.

These and other aspects and advantages will become apparent to those of ordinary skill in the art by reading the following detailed description, with reference where appropriate to the accompanying drawings. Further, it should be understood that the foregoing summary is merely illustrative and is not intended to limit in any manner the scope or range of equivalents to which the appended claims are lawfully entitled.

BRIEF DESCRIPTION OF THE DRAWINGS

The invention is described below in connection with the following illustrative figures, wherein.

DETAILED DESCRIPTION

Figure 1:
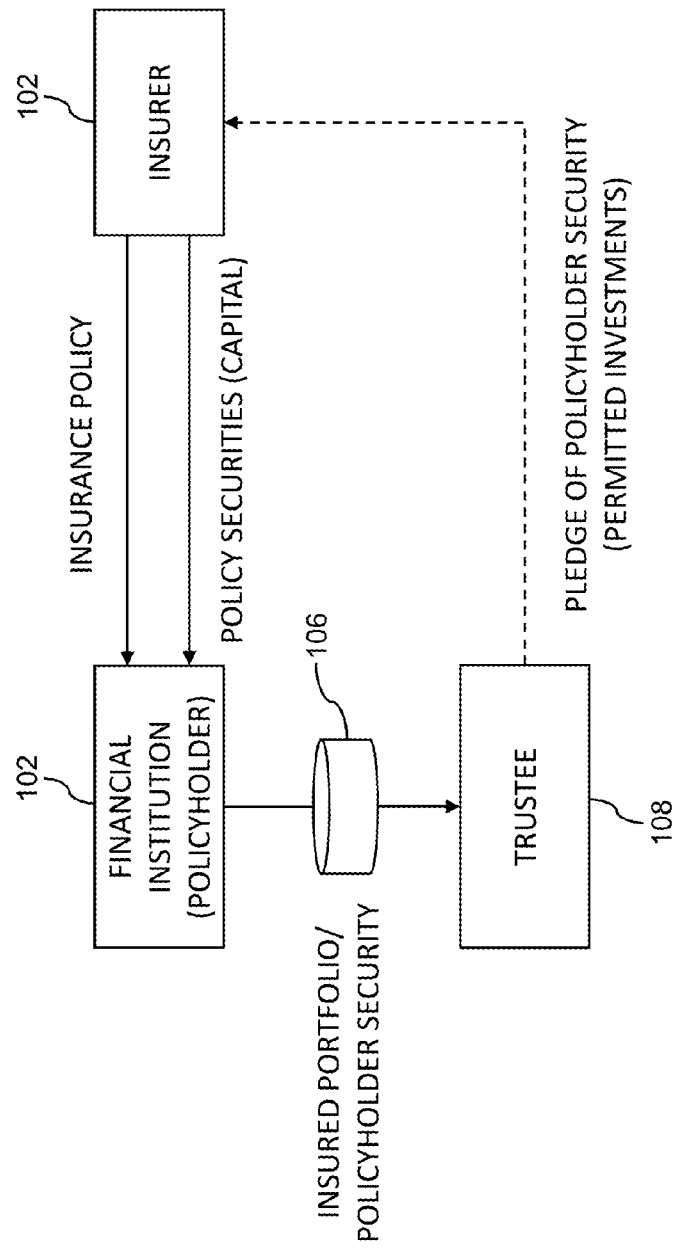
FIG. 1 is a schematic illustration of principal transactions of a gap insurance program at inception, according to an embodiment.

While the present invention is capable of being embodied in various forms, for simplicity and illustrative purposes, the principles of the invention are described by referring to several embodiments thereof. It is understood, however, that the present disclosure is to be considered as an exemplification of the claimed subject matter, and is not intended to limit the appended claims to the specific embodiments illustrated. It will be apparent to one of ordinary skill in the art that the invention may be practiced without limitation to these specific details. In other instances, well-known methods and structures have not been described in detail so as not to unnecessarily obscure the invention.

In general, programs described below allow for a first entity, such as a financial institution, to avoid Gap losses in the first instance, and to mitigate the adverse capital impact of historical Gap losses. Tangible results of the program include the receipt of tier one capital by generating a profit, and the receipt of capital relief by restoring the valuation difference between the reported or fair market value of an asset at the inception of the program, and the attachment value.

As further described below, a cash-collateralized asset value insurance program is implemented between two entities with regard to an asset, such as FIS or a FIS Portfolio. Prior to implementation of the program, it may be determined that that one or more of a first party's assets are undervalued with respect to its perceived and modeled true economic value. Additionally or alternatively, the first party may desire to protect one or more assets against future losses in value due to market or non-economic factors. In order to increase profits, reduce risk and obtain capital relief in relation to the difference between the book value of the asset and its economic value, and to obtain other benefits, the first party may enter into an agreement with a second party to implement the gap insurance program with regard to one or more selected assets. The first party may be a bank, insurance company, financial institution, or any other owner of financial assets.

The selected asset may be a single asset, a FIS or FIS Portfolio, or any other principal bearing asset or combination thereof, including a portfolio of multiple assets.

At inception, the second party provides to a first party a contract (the "Policy") for protecting the first party against the possibility of an underlying asset (the "Insured Asset") having an overall loss in value below a certain value (the "Policy Attachment Value") and up to a limit (the "Policy Limit"). For settlement purposes of the Policy, changes in value are determined based on the total maturity or default recovery proceeds of the Insured Asset (i.e., the aggregate principal payments (APP) of the selected asset). The Policy provides for the first party to make a claim if the APP of the Insured Asset is less than the Policy Attachment Value. Because recovery under the Policy is restricted to the amount of the Policy Limit, any losses below a value equal to the Policy Attachment Value that exceed the Policy Limit are not covered by the Policy. The value below which the first party is not covered is the "Policy Exit Value."

On the inception date of the Policy the second party provides to the first party collateral (the "Policy Security"). Any claim by the first party under the policy is held against this Policy Security. Accordingly, the Policy Security is generally a cash deposit equal to the Policy Limit. Under the terms of the Policy, the Policy Security may be used without restriction by the first party. Therefore, through the initial transaction and receipt of the Policy Security, the first party realizes immediate capital relief equal to the Policy Limit.

The first party also pledges security (the "Policyholder Security") for its future obligation to return all or a portion of the Policy Security should no claims arise under the Policy, or if the Policy Security exceeds the amount of the claims. The Policyholder Security may include the Insured Asset, or other securities agreed upon by the parties, or any combination thereof. For example, the parties may agree that the Policy Security is to be used to purchase a portfolio of securities, and that this portfolio of securities is to serve as the Policyholder Security. The Policyholder Security may be held in trust either by the first party or by a third party custodian, and may be margined periodically.

On the termination date of the Policy, which is generally on the maturity or default date of the Insured Asset, the APP of the asset is calculated. If the APP is greater than the Policy Attachment Value, then no claim is made by the first party and the Policy Security is returned to the second party, and the second party receives a percentage of the positive difference between the APP and the Policy Attachment Value. If the APP is less than the Policy Attachment Value but greater than the Policy Exit Value, then the first party makes a claim under the Policy, retains the amount of the Policy Security necessary to compensate for the loss in value of the Insured Asset, and returns the remaining portion of the Policy Security. If the overall loss in value of the Insured Asset is below the Policy Attachment Value and the magnitude of the loss exceeds the Policy Limit (i.e., the APP of the Insured Asset is below the Policy Exit Value), then the first party makes a claim under the policy and retains the entire Policy Security. Accordingly, through the implementation of the program the first party experiences relief from at least a portion of the Gap risk associated with losses in the value of the Insured Asset. Any losses experienced by the first party—in excess of those previously realized prior to the implementation of the program—are reduced by an amount up to the Policy Limit of the Policy. Through the issuance of the cash-collateralized Policy, the second party effectively takes on the risk of losses in relation to an Insured Asset APP that is below the Policy Attachment Value, up to an amount equal to the Policy Security (i.e., losses between the Policy Attachment Value and the Policy Exit Value).

The Policy Attachment Value may be calculated in relation to the economic value of the Insured Asset, as determined by reference to an economic model. This economic model may determine the expected value of the portfolio by calculating any fees along with the expected interest and principal payments of the investment over time, as modified by certain economic and non-economic risk factors. Additionally or alternatively, the Policy Attachment Value may be calculated as a percentage of the face value of the Insured Asset (i.e., the value of expected principal payments from the Insured Asset notwithstanding market or risk factors). The Policy Limit may be determined as a percentage of the aggregate face value of the Insured Asset. Alternatively, the Policy Limit may be determined in connection with the Policy Exit Value, and such that the Policy Exit Value is equal to a specific, desired value. For example, the Policy Limit may be determined such that the Policy Exit Value is a fixed percentage of the face value of the Insured Asset. The face value or economic value of the Insured Asset may be calculated at the outset by the parties or an investment advisor using an economic model, which may be implemented by a processing system having software specifically adapted for such modeling.

The termination date of the Policy is generally co-terminus with the maturity date of the Insured Asset, with an earlier expiration provided for upon default. However, the program may also provide for early termination of the Policy by the first party. The first party may be permitted to cancel the Policy in whole or in part at any time by paying the second party a termination premium (commutation fee) which may be agreed upon by the parties and which may be determined such that the second party receives a minimum return on its investment, or such that the second party can fulfill any necessary obligations to third-party investors. Where the Insured Asset comprises a portfolio of assets, the first party may cancel the Policy in part prior to the termination date through a proportional reduction in exposure of the assets in the portfolio.

According to the terms of the program, and as compensation for taking on Gap risk associated with the Insured Asset, the Policy may provide for a fixed annual premium (the "Policy Premium") to be paid by the first party to the second party. The Policy Premium may be determined to be a percentage of the Policy Limit. In addition, the Policy may provide for a variable interest (the "Policy Security Interest") to be paid by the first party to the second party based on the value of the Policy Security. For example, the Policy Security Interest may have a base component equal to the 3 or 6 month Libor, Federal Reserve, or Prime Interest Rate, plus and additional 0.5% to 2.5%, or therebetween. In addition, this Policy Security Interest may have a bonus component that may be determined according to a risk assessment of the Insured Asset and the Policy terms in general.

In addition to the above compensation, the Policy may provide for the sharing of any Insured Asset value in excess of the Policy Attachment Value. Where APP of the Insured Asset exceeds the Policy Attachment Value, the Policy may provide a profit sharing arrangement whereby the second party receives a fixed percentage of the APP over the Policy Attachment Value as a "Profit Commission," and whereby the first party retains the balance.

Prior to inception, the parties may make trust arrangements for the management of the Insured Asset, such as by establishing a trustee (the "Security Trustee") to hold the Insured Asset for the term of the program. The Security Trustee directs cash received from principal repayments and/or recovery cash flows from the Insured Asset to be held until the Policy expiry date. As added security, the Insured Asset or portions thereof are not allowed to be sold or assigned without the prior written consent of the second party. At the expiry date, the Security Trustee may be charged with determining the APP of the Insured Asset and calculating the difference between it and the Policy Attachment Value and the Policy Exit Value. In addition, the Security Trustee or a third party investment advisor may be responsible for determining the face value of the Insured Asset at inception.

To raise capital for the Policy Security, the second party may issue certain equity notes or securities (the "Insurer Securities"). These securities may be purchased by various third-party investors, and may carry with them a characteristic interest rate, fee and dividend arrangement. The Insurer Securities may have basic equity payment arrangements that consist of a base dividend and a risk premium dividend (the "Base Security Payments"). The base dividend can be indexed to a major interest rate index plus a fixed spread, such as from 0.25% to 1.25%. The risk premium may be based on a percentage of the face value of the Insurer Securities, such as from 3.0% to 7.0%. The Insurer Securities may also provide variable dividends, which may include all or a portion of payments to the second party from any excess over the Policy Attachment Value, after servicing any management fees and base equity payments.

Prior to inception or at inception of the program, the parties may coordinate with or consult an investment group to develop a specific cash-collateralized gap insurance program that considers the amount of economic and non-economic risk associated with the Insured Asset. Developing the program may include determining a non-economic value of the Insured Asset, determining a real economic value and face value of the Insured Asset, determining Policy Security for the Policy, determining a Policy Attachment Value, determining a Policy Exit Value, determining a base dividend and bonus dividend for the Policy Security Interest, determining a Policy Premium, determining a profit sharing value or percentage, and determining the expiry date. The specific values for these and other variables may be determined utilizing economic and risk based models, and by using computer processing systems having software adapted to determining these and other values. In addition, the parties may determine the conditions for early termination of the contract, if any.

Additional aspects of the gap insurance program are apparent in view of the following examples, which are for explanatory purposes only and which are not in any way intended to limit the scope of the program.

Insurance Program Example 1

In one example, a first party financial institution (the "Policyholder") and a second party investment group (the "Insurer") enter into an agreement to establish a gap insurance program for the mutual benefit of both parties. The parties select as the Insured Asset a FIS Portfolio (the "Insured Portfolio") owned by the Policyholder which the Policyholder either determines to be undervalued in the current market, or desires to protect against future losses in value due to market conditions. In order to realize a capitalization of the FIS Portfolio that is more consistent with its perceived economic value, the Policyholder coordinates with or consults the Insurer or an investment advisor to develop a specific insurance program that takes into account the amount of economic and non-economic risk associated with the FIS Portfolio.

By agreement of the parties, the insurance program is established with a Policy Attachment Value of 90, a Policy Exit Value of 80, and with the Policy Limit and Policy Security therefore being equal to 10. In addition, the profit participation for the Insurer with respect to the Excess Payments is determined to be 100% of the excess (i.e., the amount of the APP over the Policy Attachment Value). Referring to FIG. 1, at inception the Policyholder 102 transfers control of the Insured Portfolio 106 to a third party trustee 108 and purchases the Policy from the Insurer 104. With the obligations of the Policyholder 102 backed by the Insured Portfolio 106 as the Policyholder Security, the Insurer 104 provides the Policy Security to the Policyholder 102 to secure potential claims payment obligations under the Policy.

Figure 2:
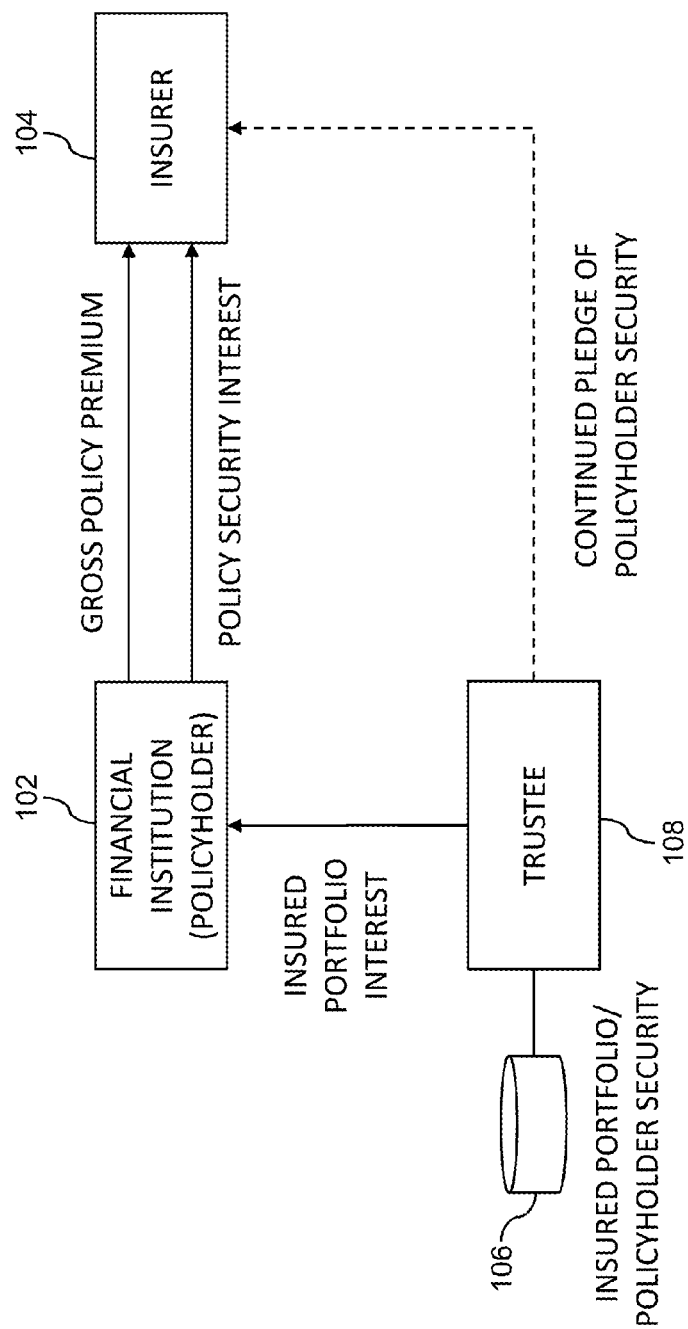
FIG. 2 is a schematic illustration of principal transactions of a gap insurance program over its term, according to an embodiment.

Referring to FIG. 2, over the term of the program the Insurer 104 periodically collects policy premiums and Policy Security interest from the Policyholder 102. The trustee 108 directs cash received from principal payments and/or recovery cash flows from the Insured Portfolio 106 to the Policyholder. Accordingly, the policy premiums and/or Policy Security interest due to the Insurer may be paid by the Policyholder directly from the returns of the Insured Portfolio. Alternatively, the trustee may calculate the policy premium and Policy Security payments and pay them directly to the Insurer for from the Insured Portfolio returns, with the balance of the returns going to the Policyholder less any fees.

Figure 3:
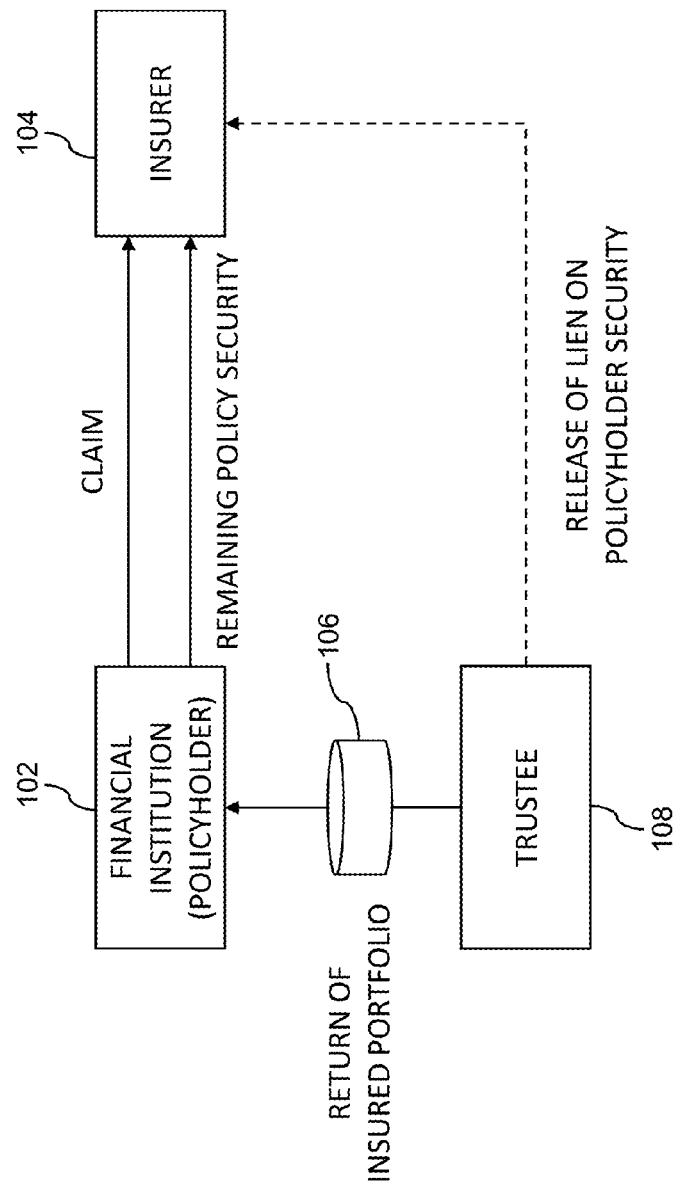
FIG. 3 is a schematic illustration of principal transactions of a gap insurance program at a termination (maturity) date in which the aggregate principal payments of the insured portfolio are less than the policy attachment value, according to an embodiment.
Figure 4:
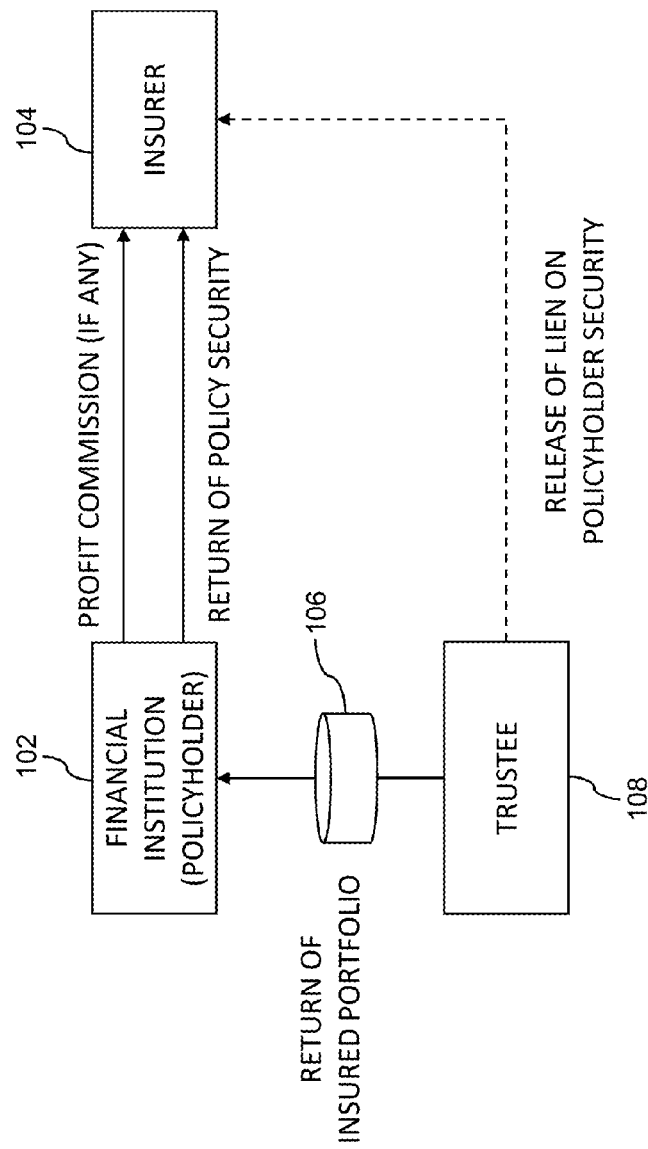
FIG. 4 is a schematic illustration of principal transactions of a gap insurance program at a termination (maturity) date in which the aggregate principal payments of the insured portfolio are greater than the policy attachment value, according to an embodiment.
Figure 9:
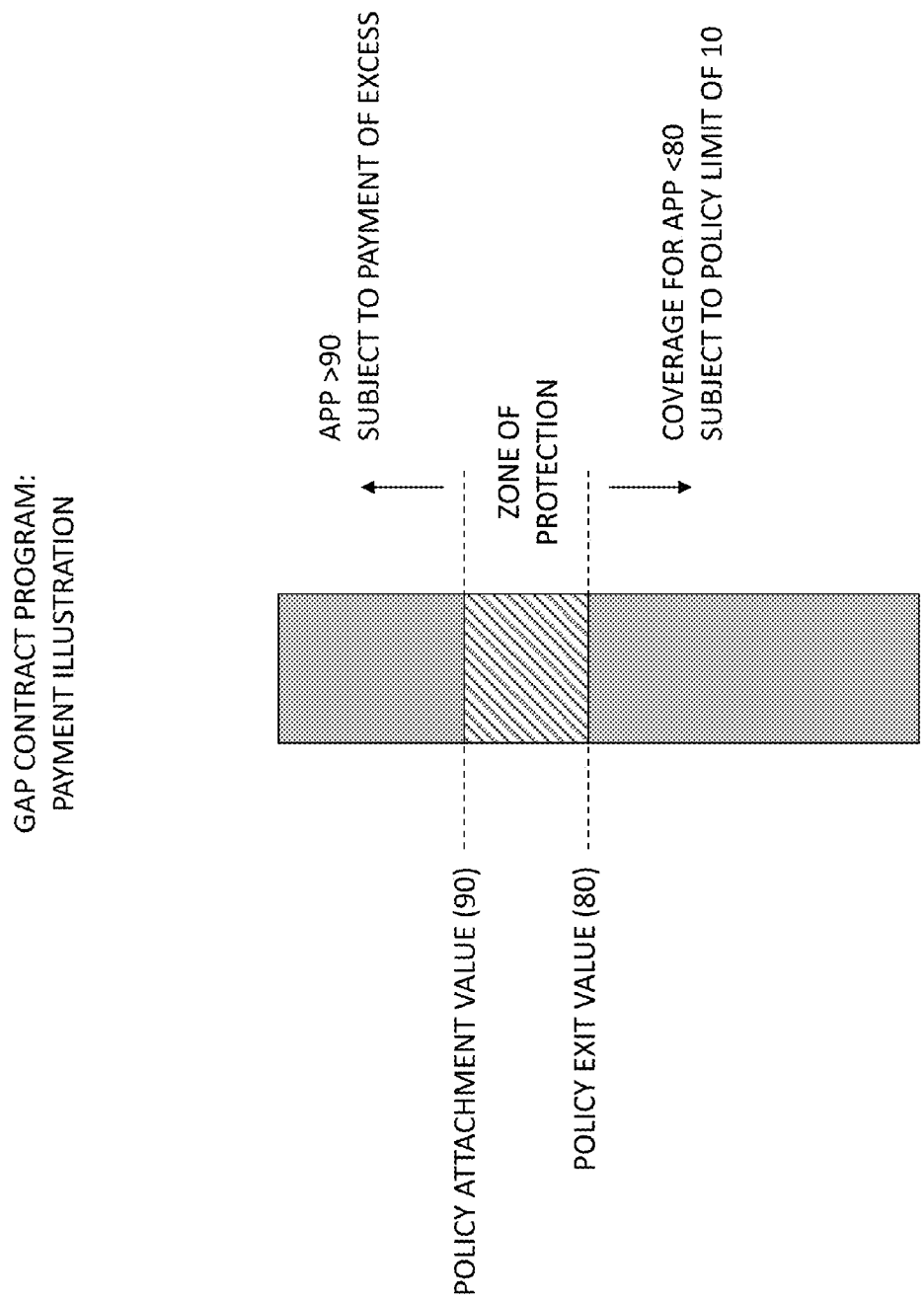
FIG. 9 is a diagram illustrating the payment scenarios for a gap insurance program having an attachment value and an exit value, according to an embodiment.

Referring to FIGS. 3 and 4, at the expiration date of the program, the APP of the Insured Portfolio 106 is determined by the trustee 108, and the difference between the Policy Attachment Value and APP is calculated. If there is a deficit (i.e., the APP is less than the Policy Attachment Value), the Policyholder 102 retains as much of the Policy Security as is necessary to compensate for the deficit, up to the entire Policy Security or Policy Limit amount, as shown in FIG. 3. Any Policy Security that is not used by the Policyholder 102 to settle claims under the Policy is then returned, in cash, to the Insurer 104. Alternatively, as shown in FIG. 4, where the APP of the Insured Portfolio 106 exceeds the Policy Attachment Value, the Policyholder 102 returns the entire Policy Security to the Insurer 102. The Insurer 102 also receives payments equal to 100% of the Insured Portfolio proceeds over the Policy Attachment Value (i.e. the "excess"), in accordance to the profit sharing agreement of the program. FIG. 9 provides an illustration of the program coverage scenarios for the example. Table 1 illustrates the potential payment amounts for this example.

TABLE 1

Program Payment Illustration

| APP | Impact to Policyholder | Impact to Insurer |
|---|---|---|
| 70 | Deficit of 20; maximum claim payment of 10 | No return of any Policy Security |
| 85 | Deficit of 5; claim payment of 5 | Return of Policy Security of 5 |
| 90 | No deficit or excess; no claim payment to Policyholder | Return of full amount of Policy Security of 10 |
| 95 | Excess of 5; no claim payment to Policyholder | Return of full amount of Policy Security of 10; payment of Profit Commission of 5 |

Given a Policy Attachment Value of 90 and a Policy Exit Value of 80, an APP of 70 at the expiration of the program results in an overall difference of 20 relative to the Policy Attachment Value. In this scenario, because the Policy Limit is 10 the total loss to the Insurer is limited to 10. The remaining portion of the loss is absorbed by the Policyholder. Accordingly, in this scenario the resulting deficit is borne equally by both the Policyholder and the Insurer.

For an APP of 85 at expiration, there is a resulting overall difference of 5. Under the terms of the Policy, the Policyholder claims the loss of 5 against the Policy Security. Accordingly, the deficit is reflected in a decrease in the amount of Policy Security returned to the Insurer. Therefore the loss in value is substantially absorbed by the Insurer, while the Policyholder maintains a slight profit over the term of the program, having only made a Policy Security refund of 5 and having retained the other half of the Policy Security received from the Insurer at inception of the program.

For an APP of 90 at expiration, the APP yield of the Insured Portfolio is equal to the Policy Attachment Value stated in the Policy and no excess or deficit is recorded. In this scenario, the Insurer recoups the full amount of the Policy Security when the Policyholder makes a maximum security refund of 10. Overall, the benefit to the Policyholder lies in having received an up-front infusion of capital and in transferring the Gap risk of the Insured Portfolio substantially to the Insurer.

For an APP of 95 at expiration, there is a resulting excess of 5 over the Policy Attachment Value. Given the profit participation of 100%, the entire excess is paid by the Policyholder to the Insurer through a Profit Commission of 5. In addition, the Insurer receives a maximum Policy Security refund of 10.

As is shown in this example, initial losses in value of the Insured Portfolio below the Policy Attachment Value are absorbed by the Insurer. Any losses below the Policy Attachment Value that exceed the Policy Limit (i.e., below the Policy Exit Value) are then absorbed by the Policyholder.

Insurance Program Example 2

In another example, a first party financial institution (the "Policyholder") and a second party investment group (the "Insurer") enter into an agreement to establish a gap insurance program for the mutual benefit of both parties. Referring generally to FIGS. 5-8, the parties have selected as the Insured Asset a FIS Portfolio (the "Insured Portfolio") owned by the Policyholder 202 which the Policyholder either determines to be undervalued in the current market, or desires to protect against future losses in value due to market conditions. In order to realize a capitalization of the Insured Portfolio 206 that is more consistent with its actual economic value, the Policyholder 202 coordinates with or consults the Insurer 204 or an investment advisor 212 to develop a specific gap insurance program that takes into account the amount of economic and non-economic risk associated with the Insured Portfolio 206.

At the outset of the program, the face value of the Insured Portfolio 206 is determined to be 1,000, and the book value (transferability value) is determined to be 800. By agreement of the parties, the insurance program is established with a Policy Attachment Value that is 90% of the face value, or 900, and a Policy Exit Value that is 80% of the face value, or 800. Accordingly, the Policy Limit and the Policy Security are 10% of the face value, or 100. In addition, the profit participation for the Insurer is determined to be 60% of any excess (i.e., the amount of the APP over the Policy Attachment Value) with the remainder being collected by the Policyholder. In addition, the Policy Premium is determined to be 5.0% of the Policy Limit payable annually in advance, while the Policy Security Interest is indexed to the 3-month LIBOR plus a spread of 0.5% per annum, payable quarterly in arrears to the Insurer. The Policyholder is permitted to cancel the Policy subject to a payment to the Insurer of a commutation fee equal to 15% per annum of the elapsed term on the Policy Limit.

Figure 5:
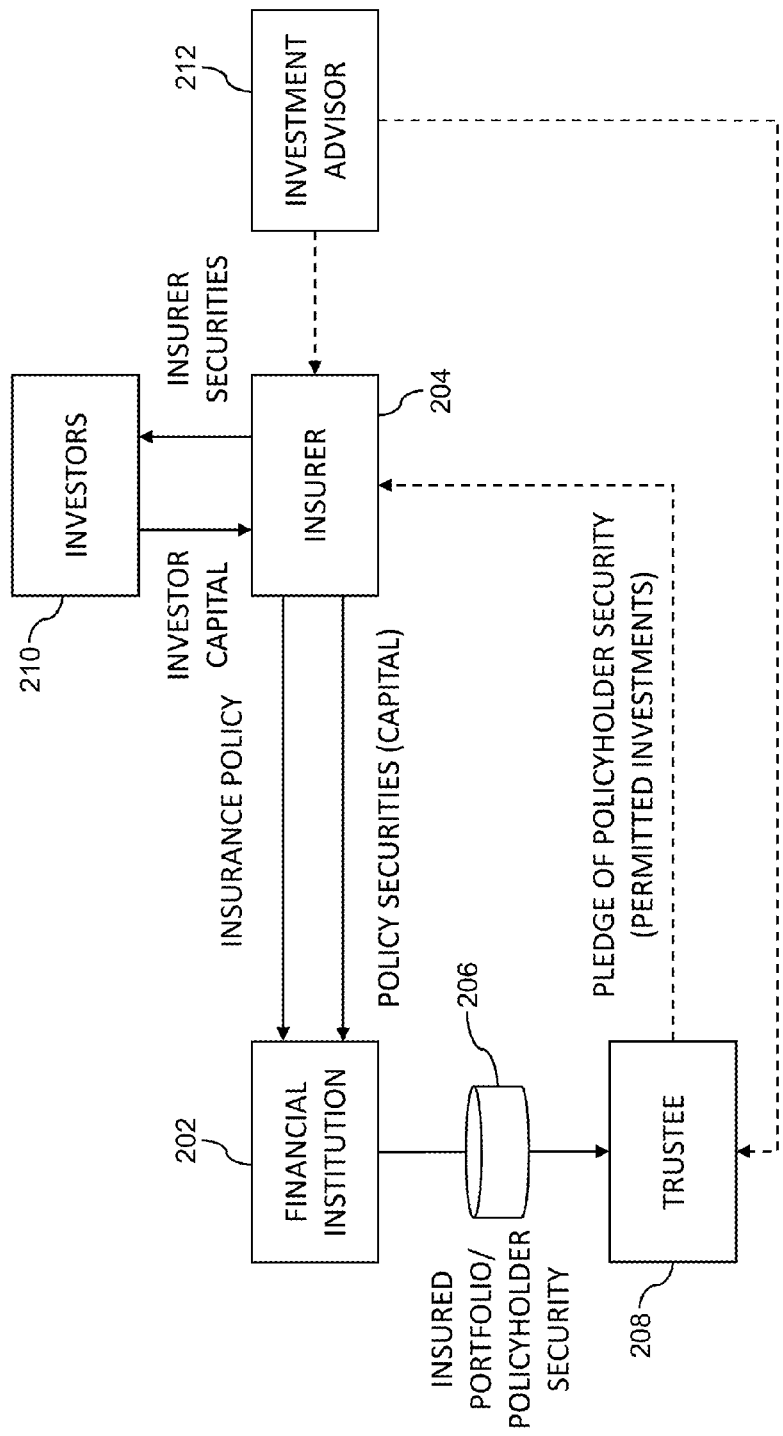
FIG. 5 is a schematic illustration of principal transactions of a gap insurance program at inception and showing a multi-tiered investment entity and interaction with an investment advisor entity, according to an embodiment.

Referring to FIG. 5, at inception the Policyholder 202 transfers control of the Insured Portfolio 206 to a third party trustee 208 and purchases the Policy from the Insurer 204. With the obligations of the Policyholder 202 backed by the Insured Portfolio 206 as the Policyholder Security, the Insurer 204 provides the Policy Security to the Policyholder 202 to secure potential claims payment obligations under the Policy. In order to raise capital to provide as the Policy Security, the Insurer 204 issues Insurer Securities that are purchased by third-party investors 210.

Figure 6:
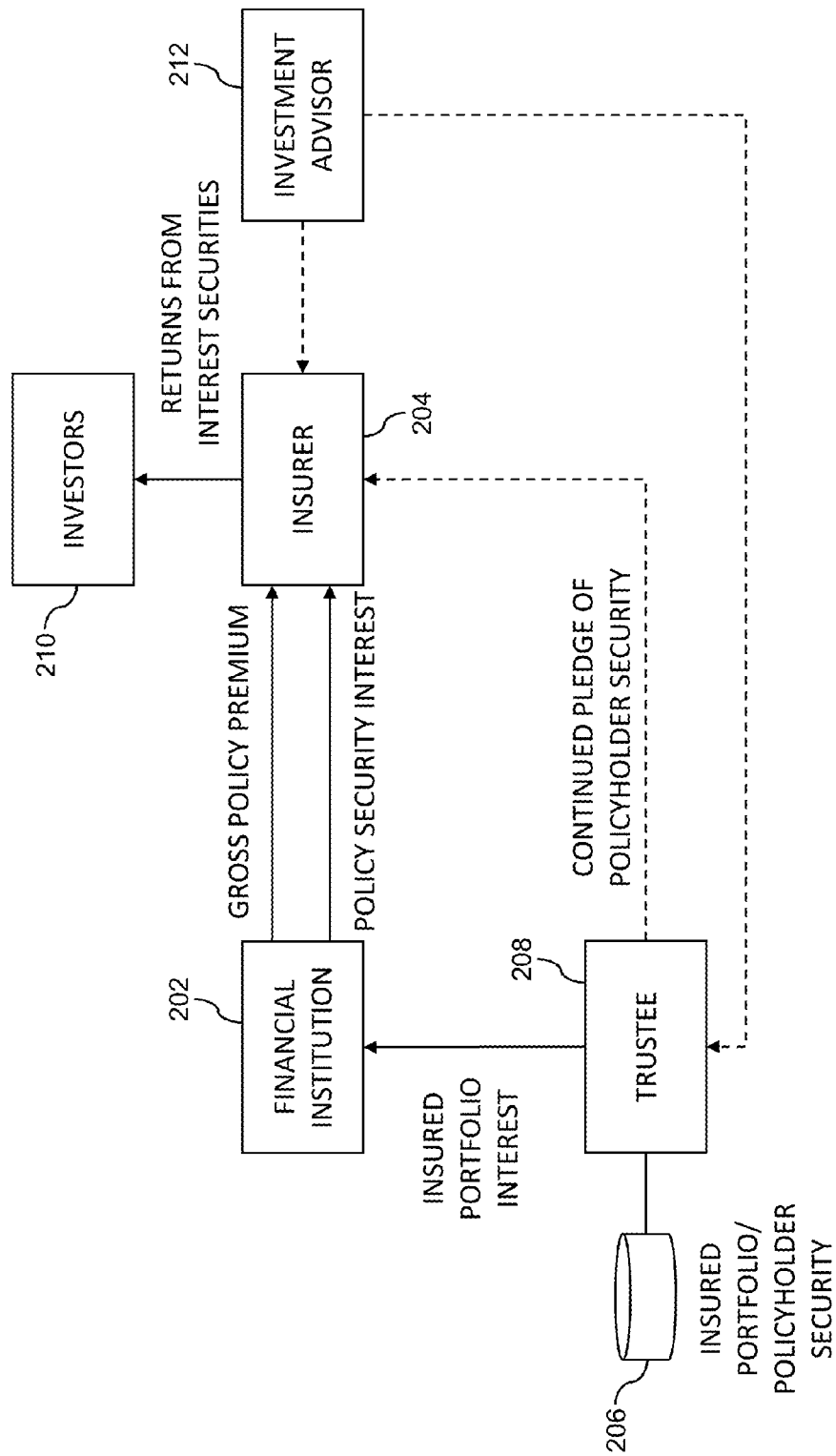
FIG. 6 is a schematic illustration of principal transactions of a gap insurance program over its term and showing a multi-tiered investment entity and interaction with an investment advisor entity, according to an embodiment.

Referring to FIG. 6, over the term of the program the Insurer 204 periodically collects policy premiums and Policy Security interest from the Policyholder 202. The trustee 208 directs cash received from principal payments and/or recovery cash flows from the Insured Portfolio 206 to the Policyholder. Accordingly, the policy premiums and/or Policy Security interest due to the Insurer may be paid by the Policyholder directly from the returns of the Insured Portfolio. Alternatively, the trustee may calculate the policy premium and Policy Security payments and pay them directly to the Insurer for from the Insured Portfolio returns, with the balance of the returns going to the Policyholder less any fees. In addition, over the term of the program the Investor 204 pays payments and dividends on the Insurer Securities to the third-party investors 210, according to the terms of the Insurer Securities.

Figure 7:
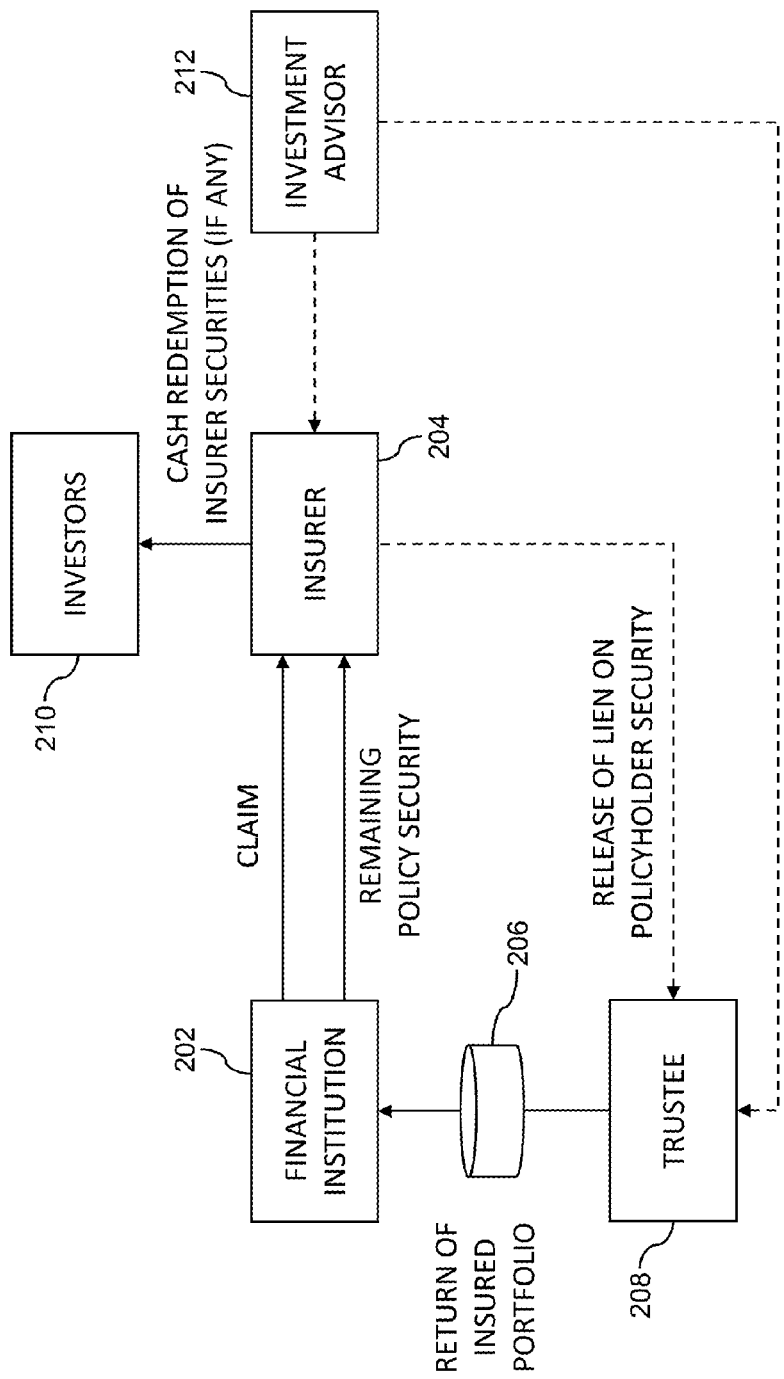
FIG. 7 is a schematic illustration of principal transactions of a gap insurance program at a termination (maturity) date in which the aggregate principal payments of the insured portfolio are less than the policy attachment value, and showing a multi-tiered investment entity and interaction with an investment advisor entity, according to an embodiment.
Figure 8:
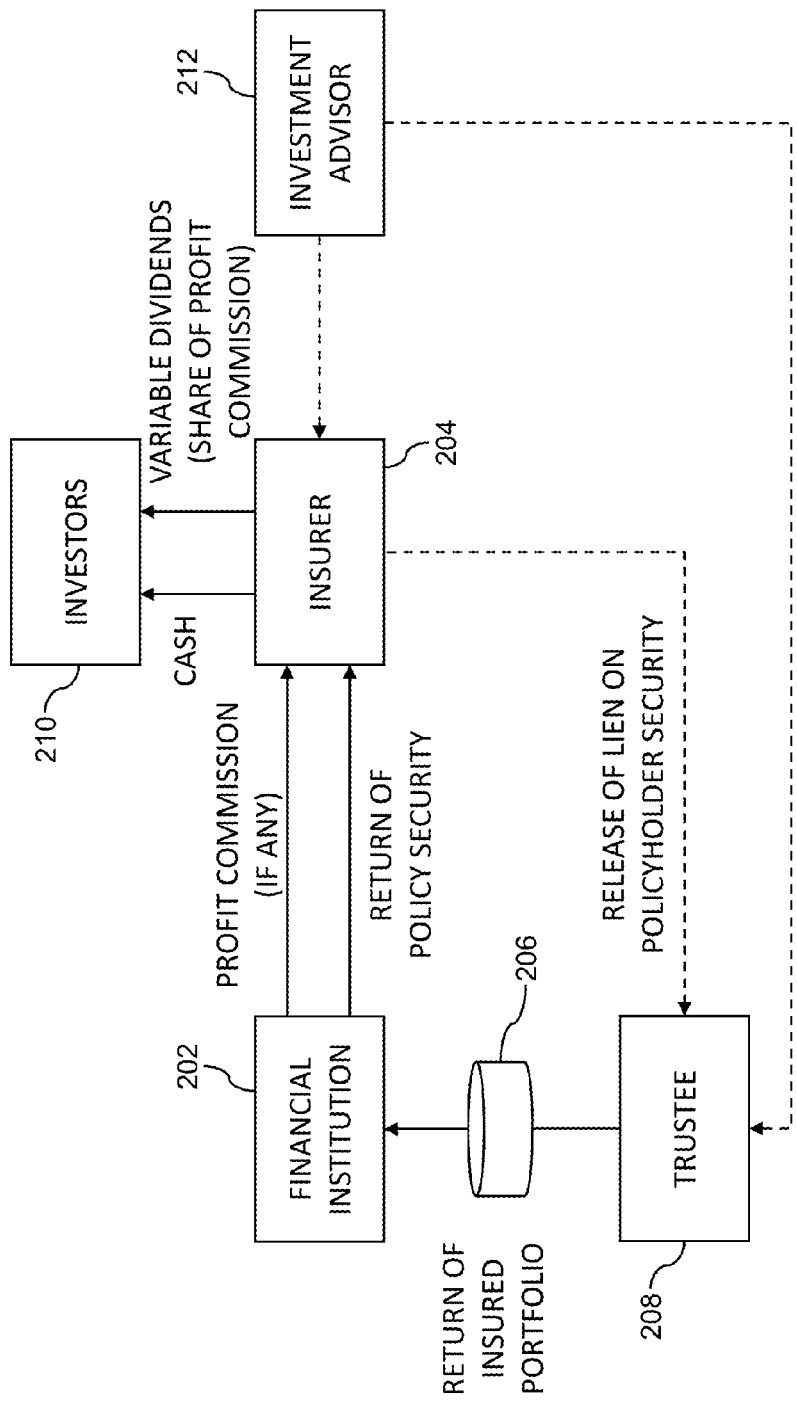
FIG. 8 is a schematic illustration of principal transactions of a gap insurance program at a termination (maturity) date in which the aggregate principal payments of the insured portfolio are greater than the policy attachment value, and showing a multi-tiered investment entity and interaction with an investment advisor entity, according to an embodiment.

Referring to FIGS. 7 and 8, at the expiration date of the program, the APP of the Insured Portfolio 206 is determined by the trustee 208, and the difference between the Policy Attachment Value and APP is calculated. If there is a deficit (i.e., the APP is less than the Policy Attachment Value), the Policyholder 202 retains as much of the Policy Security as is necessary to compensate for the deficit, up to the entire Policy Security or Policy Limit amount, as shown in FIG. 7. Any Policy Security that is not used by the Policyholder 202 to settle claims under the Policy is then returned, in cash, to the Insurer 204. Alternatively, as shown in FIG. 8, where the APP of the Insured Portfolio 206 exceeds the Policy Attachment Value, the Policyholder 202 returns the entire Policy Security to the Insurer 204. The Insurer 204 also receives payments equal to 60% of the Insured Portfolio proceeds over the Policy Attachment Value (i.e. the "excess"), in accordance to the profit sharing agreement of the program. In addition, at the expiration date the third-party investors 210 redeem the Insurer Securities, including any dividends for profit collected by the Insurer 204, or as otherwise in accordance with the terms of the Insurer Securities.

Tables 2 and 3 provide illustrations of the economics for the Policyholder 202 and Insurer 204, respectively, according to the terms in the example insurance program and for various APP scenarios. In addition, FIG. 8 provides an illustration of the overall value collected from the Insured Portfolio 206 by the Insurer 204 for various APP scenarios, both with and without the gap insurance program having been implemented. FIG. 9 provides an illustration of the benefit analysis for the Policyholder both with and without the gap insurance program having been implemented, and additionally shows the payments due to the Insurer according to various APP scenarios.

TABLE 2

Illustration of Policyholder Economics

| | APP Scenarios | | | | | | | | |
|---|---|---|---|---|---|---|---|---|---|
| | 100% | 95% | 90% | 85% | 80% | 75% | 70% | 65% | 60% |
| Policy Security (cash) received at inception | 100 | 100 | 100 | 100 | 100 | 100 | 100 | 100 | 100 |
| APP to Policyholder at expiry | 1,000 | 950 | 900 | 850 | 800 | 750 | 700 | 650 | 600 |
| Bond gain/(loss) without Program | 200 | 150 | 100 | 50 | — | (50) | (100) | (150) | (200) |
| Claims paid from Policy Security | — | — | — | 50 | 100 | 100 | 100 | 100 | 100 |
| Return of Policy Security | 100 | 100 | 100 | 50 | — | — | — | — | — |
| Profit Commission paid | 60 | 30 | — | — | — | — | — | — | — |
| Net to Policyholder w/ Contract | 940 | 920 | 900 | 900 | 900 | 850 | 800 | 750 | 700 |
| Net to Policyholder w/out Program | 1,000 | 950 | 900 | 850 | 800 | 750 | 700 | 650 | 600 |
| Policyholder benefit/(cost) with Program | 140 | 120 | 100 | 100 | 100 | 50 | — | (50) | (100) |
| Policyholder benefit/(cost) without Program | 200 | 150 | 100 | 50 | — | (50) | (100) | (150) | (200) |

TABLE 3

Illustration of Insurer Economics

| | APP Scenarios | | | | | | | | |
|---|---|---|---|---|---|---|---|---|---|
| | 100% | 95% | 90% | 85% | 80% | 75% | 70% | 65% | 60% |
| Policy Security paid at inception | (100) | (100) | (100) | (100) | (100) | (100) | (100) | (100) | (100) |
| Return of Policy Security | 100 | 100 | 100 | 50 | — | — | — | — | — |
| Profit Commission Received | 60 | 30 | — | — | — | — | — | — | — |
| Insurer net gain/(loss) | 60 | 30 | — | (50) | (100) | (100) | (100) | (100) | (100) |

As is again shown in this example, initial losses in value of the Insured Portfolio below the Policy Attachment Value are absorbed by the Insurer. Any further losses below the Policy Attachment Value (i.e., below the Policy Exit Value) are then absorbed by the Policyholder. Moreover, the Policyholder is able to essentially secure the value of the Insured Portfolio at the Policy Attachment Value over a significant range of losses.

Figure 10:
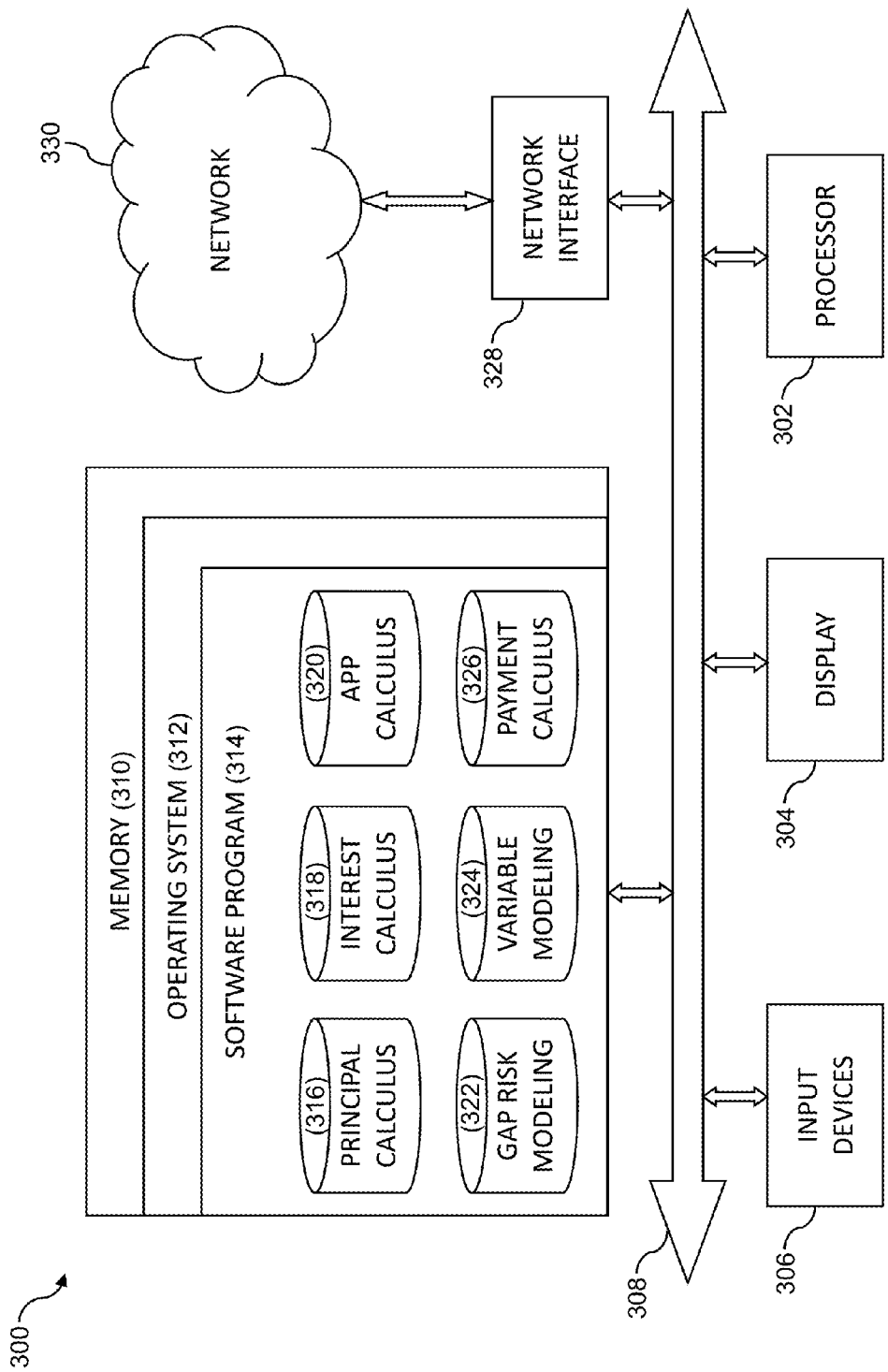
FIG. 10 is a schematic diagram of a processing system for implementing portions of the gap insurance program including gap risk modeling and determination of program variables, according to an embodiment.
Figure 11:
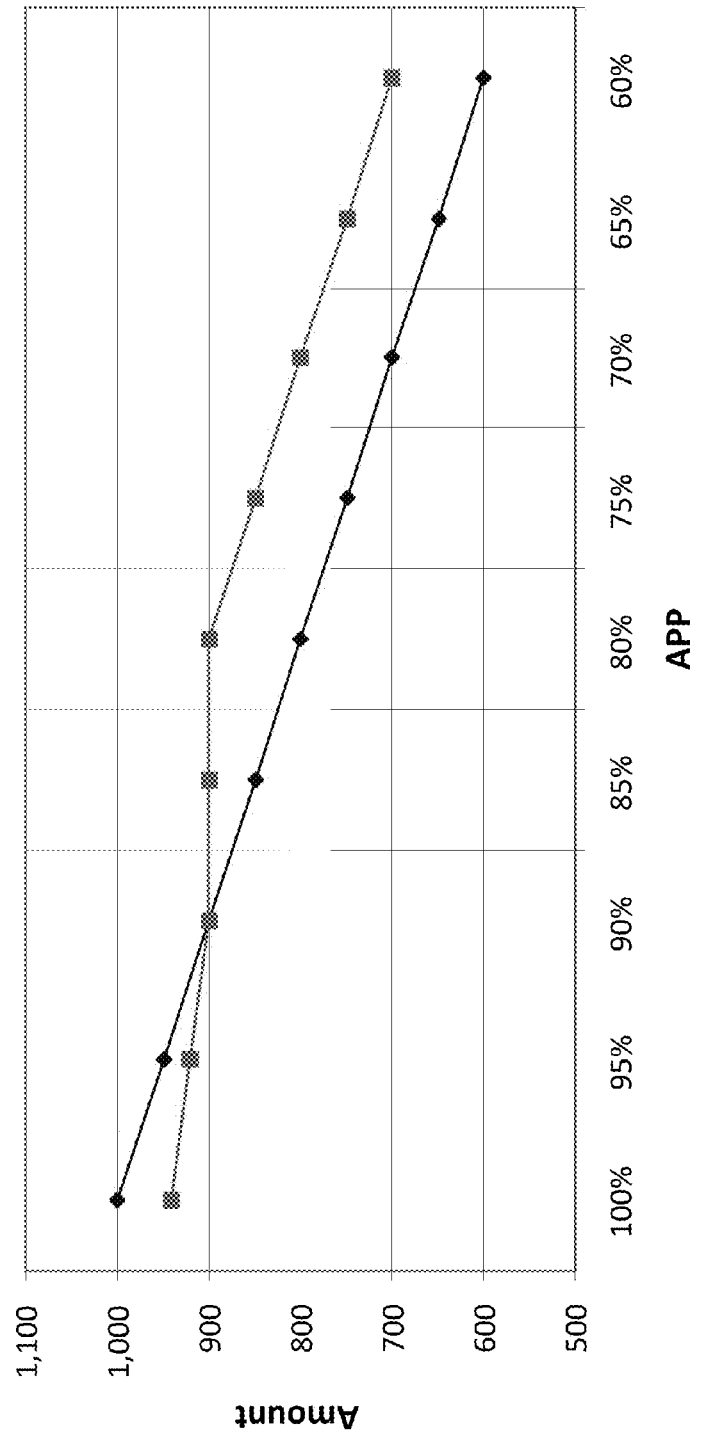
FIG. 11 is a chart illustrating for an policyholder the value collected from a protected portfolio—with and without a gap insurance program in place—for various aggregate principal payment scenarios, according to an embodiment.
Figure 12:
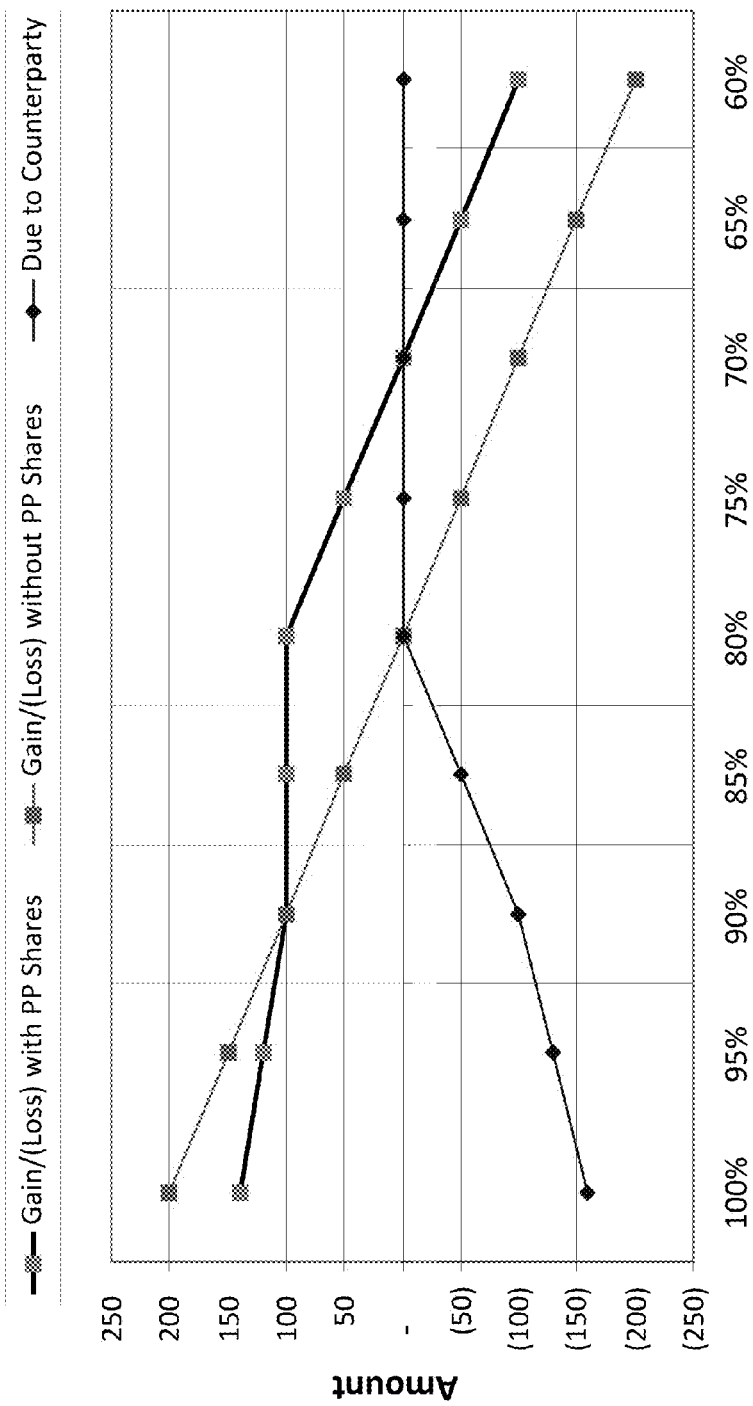
FIG. 12 is a chart illustrating for an policyholder the benefit analysis for a given protected portfolio—with and without implementing a gap insurance program—including values due to a policy issuer (an insurer) for various aggregate principal payment scenarios, according to an embodiment.

Referring to FIG. 10, the variables for the insurance program are calculated using a processing system 300 that has software adapted to determining these values. The processing system 300 has a processor 302 for executing instructions from the memory 310, processing input from the input devices 306, communicating with the display 304, and processing data from any other peripherals. The processor 302, memory 310, input devices 306, display 304, network interface 328, and other peripherals may be communicably coupled via a single bus 308. Alternatively, these and other components may be joined by multiple buses, or several individual dedicated buses. The network interface 328 may communicably couple the processing system 300 to an external network of other processing systems. In addition, multiple processing systems may be linked via the network in order to coordinate the determination of variables for the share program.

The memory 310 has stored therein an operating system 312 and a multiplicity of software programs 314 designed to operate on the operating system 312. The software programs include: a program 316 that calculates the principal payments of the Insured Portfolio 316, a program 318 that calculates the interest of the Insured Portfolio 318, a program 320 that calculates the APP of the Insured Portfolio on an ongoing basis, a program 322 that models the Gap risk associated with the Insured Portfolio, a program 324 that models the program variables under various scenarios, and a program 326 that calculates the payments due each party under the terms of the program.

While the invention has been described in terms of several preferred embodiments, it should be understood that there are many alterations, permutations, and equivalents that fall within the scope of this invention. It should also be noted that there are alternative ways of implementing both the process and apparatus of the present invention. For example, steps do not necessarily need to occur in the orders shown in the accompanying figures, and may be rearranged as appropriate. It is therefore intended that the appended claim includes all such alterations, permutations, and equivalents as fall within the true spirit and scope of the present invention.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the present disclosure.

Multiple embodiments are described herein, including the best mode known to the inventors for practicing the claimed invention. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context.

The use of individual numerical values are stated as approximations as though the values were preceded by the word "about" or "approximately." Similarly, the numerical values in the various ranges specified in this application, unless expressly indicated otherwise, are stated as approximations as though the minimum and maximum values within the stated ranges were both preceded by the word "about" or "approximately." In this manner, variations above and below the stated ranges can be used to achieve substantially the same results as values within the ranges. As used herein, the terms "about" and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about" or "approximately" will serve to broaden a particular numerical value or range. Thus, as a general matter, "about" or "approximately" broaden the numerical value. Also, the disclosure of ranges is intended as a continuous range including every value between the minimum and maximum values plus the broadening of the range afforded by the use of the term "about" or "approximately." Thus, recitation of ranges of values herein are merely intended to serve as a shorthand method of referring individually to each separate value falling within the range, unless otherwise indicated herein, and each separate value is incorporated into the specification as if it were individually recited herein.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

I claim:

1. A method for implementing an insurance program for quantifying and transferring non-economic risk between a first party and a second party, said method comprising:
    receiving data representing an asset belonging to the first party, wherein the data includes a market value of the asset and expected principal payments of the asset;
    generating an economic value of the asset based on the data representing the asset;
    calculating a policy attachment value for the program based on the economic value;
    calculating a policy limit based on the market value of the asset and the policy attachment value, wherein the second party provides an insurance policy to the first party under which the asset is insured against losses from the policy attachment value up to the policy limit;
    calculating a policy security based on the policy limit, wherein the second party provides the policy security to the first party as collateral for its obligation to insure the asset;
    determining aggregate principal payments (APP) of the asset upon termination of the insurance policy;
    calculating a claim amount based on the APP, the policy attachment value, and the policy limit, wherein the first party is entitled under the program to make a claim for the claim amount, up to the policy limit, when the APP is less than the policy attachment value, and wherein the first party is entitled under the program to retain a portion of the policy security necessary to fulfill its claim and is obliged under the program to return any remaining portion of the policy security to the second party; and
    displaying the claim amount;
    wherein the step of generating an economic value is performed by a computer.

2. The method of claim 1 wherein calculating an economic value of the asset comprises:
    performing a risk analysis based on the data representing the asset; and
    determining the net present value of expected future principal payments according to the risk analysis.

3. The method of claim 1 wherein the second party is entitled under the program to receive a portion of any APP that exceeds the policy attachment value ("profit commission"), and wherein the method further comprises the steps of:
    calculating a profit commission due under the program; and
    indicating the amount of profit commission due under the program.

4. The method of claim 1 wherein the data representing the asset further includes a maturity date of the asset, and wherein the termination of the insurance policy is the maturity date of the asset.

5. The method of claim 1 further comprising the step of calculating a policy premium based on a percentage of the policy limit, wherein the first party periodically pays the second party the policy premium.

6. The method of claim 1 further comprising the step of calculating a policy security interest having a base component based on a major interest rate index, wherein the first party periodically pay periodically pays the second party the policy security interest.

7. The method of claim 6 wherein the policy security interest also has a bonus component that is a based on a risk assessment of the asset.

8. The method of claim 1 further comprising the step of determining a termination premium for the early termination of the program insurance policy, wherein the first party terminates the insurance policy by paying the second party the redemption premium.

9. The method of claim 1 wherein the first party pledges a second security for its obligation to return the policy security.

10. The method of claim 9 wherein the second security is the asset.

11. The method of claim 9 wherein the first party transfers the second security to a third party to hold the second security in trust for the duration of the insurance policy.

12. A computer-readable medium for implementing an insurance program for quantifying and implementing the transfer of non-economic risk between a first party and a second party, the computer-readable medium bearing a computer program containing non-transitory instructions which, when implemented by a computer, cause the computer to execute the steps of:
    receiving data representing an asset belonging to the first party, wherein the data includes a market value of the asset and principal payments of the asset;
    generating an economic value of the asset based on the data representing the asset;
    calculating a policy attachment value for the program based on the economic value;
    calculating a policy limit based on the market value of the asset and the policy attachment value, wherein the second party provides an insurance policy to the first party under which the asset is insured against losses from the policy attachment value up to the policy limit;

calculating a policy security based on the policy limit, wherein the second party provides the policy security to the first party as collateral for its obligation to insure the asset;

determining aggregate principal payments (APP) of the asset upon termination of the insurance policy;

calculating a claim amount based on the APP, the policy attachment value, and the policy limit, wherein the first party is entitled under the insurance program to make a claim for the claim amount, up to the policy limit, when the APP is less than the policy attachment value, and wherein the first party is entitled under the insurance program to retain a portion of the policy security necessary to fulfill its claim and is obliged under the program to return any remaining portion of the policy security to the second party; and displaying the claim amount.

13. The computer-readable medium of claim 12 wherein calculating an economic value of the asset comprises:

performing a risk analysis based on the data representing the asset; and determining the net present value of expected future principal payments according to the risk analysis.

14. The computer-readable medium of claim 12 wherein the second party is entitled under the insurance program to receive a portion of any APP that exceeds the policy attachment value ("profit commission"), and wherein the computer program further contains instructions for:

calculating a profit commission due under the insurance program; and indicating the amount of profit commission due under the insurance program.

15. The computer-readable medium of claim 12 wherein the data representing the asset further includes a maturity date of the asset, and wherein the termination of the insurance policy is the maturity date of the asset.

16. The computer-readable medium of claim 12 wherein the computer program further contains instructions for calculating a policy premium based on a percentage of the policy limit, wherein the first party periodically pays the second party the policy premium.

17. The computer-readable medium of claim 12 wherein the computer program further contains instructions for calculating a policy security interest having a base component based on a major interest rate index, wherein the first party periodically pays the second party the policy security interest.

18. The computer-readable medium of claim 17 wherein the policy security interest also has a bonus component that is a based on a risk assessment of the asset.

19. The computer-readable medium of claim 12 wherein the computer program further contains instructions for determining a termination premium for the early termination of the insurance policy, wherein the first party terminates the insurance policy by paying the second party the redemption premium.

20. The computer-readable medium of claim 12 wherein the first party pledges a second security for its obligation to return the policy security.

21. The method of claim 20 wherein the second security is the asset.

22. The computer-readable medium of claim 20 wherein the first party transfers the second security to a third party to hold the second security in trust for the duration of the insurance policy.

23. An apparatus for executing an insurance program for quantifying and implementing the transfer of non-economic risk between a first party and a second party comprising:

a processor;

a display;

a memory coupled to the processor and containing instructions executable by the processor which, when implemented by the processor, cause the processor to execute the steps of:

receiving data representing an asset belonging to the first party, wherein the data includes a market value of the asset and expected principal payments of the asset;

generating an economic value of the asset based on the data representing the asset;

calculating a policy attachment value for the program based on the economic value;

calculating a policy limit based on the market value of the asset and the policy attachment value, wherein the second party provides an insurance policy to the first party under which the asset is insured against losses from the policy attachment value up to the policy limit;

calculating a policy security based on the policy limit, wherein the second party provides the policy security to the first party as collateral for its obligation to insure the asset;

determining the aggregate principal payments (APP) of the asset upon termination of the insurance policy;

calculating a claim amount based on the APP, the policy attachment value, and the policy limit, wherein the first party is entitled under the program to make a claim for the claim amount, up to the policy limit, when the APP is less than the policy attachment value, and wherein the first party is entitled under the program to retain a portion of the policy security necessary to fulfill its claim and is obliged under the program to return any remaining portion of the policy security to the second party; and displaying the claim amount on the display.

24. The apparatus of claim 23 wherein calculating an economic value of the asset comprises:

performing a risk analysis based on the data representing the asset; and determining the net present value of expected future principal payments according to the risk analysis.

25. The apparatus of claim 23 wherein the second party is entitled under the program to receive a portion of any APP that exceeds the policy attachment value ("profit commission"), and wherein the memory further contains instructions for:

calculating a profit commission due under the program; and indicating the amount of profit commission due under the program.

26. The apparatus of claim 23 wherein the data representing the asset further includes a maturity date of the asset, and wherein the termination of the insurance policy is the maturity date of the asset.

27. The apparatus of claim 23 wherein the memory further contains instructions for calculating a policy premium based on a percentage of the policy limit, wherein the first party periodically pays the second party the policy premium.

28. The apparatus of claim 23 wherein the memory further contains instructions for calculating a policy security interest having a base component based on a major interest rate index, wherein the first party periodically pays the second party the policy security interest.

29. The apparatus of claim 28 wherein the policy security interest also has a bonus component that is a based on a risk assessment of the asset.

30. The apparatus of claim 23 wherein the memory further contains instructions for determining a termination premium for the early termination of the program, wherein the first party is permitted under the program to cancel the program prior to the term date by paying the second party the redemption premium.

31. The apparatus of claim 23 wherein the first party pledges a second security for its obligation to return the policy security.

32. The apparatus of claim 31 wherein the second security is the asset.

33. The apparatus of claim 31 wherein the first party transfers the second security to a third party to hold the second security in trust for the duration of the insurance policy.

* * * * *